(12) United States Patent
Huskey (10) Patent No.: US 9,623,924 B2
(45) Date of Patent: Apr. 18, 2017

(54) CART

(71) Applicant: Theodore A. Huskey, Sandy, OR (US)

(72) Inventor: Theodore A. Huskey, Sandy, OR (US)

(*) Notice: Subject to any disclaimer, the term of this patent is extended or adjusted under 35 U.S.C. 154(b) by 0 days.

(21) Appl. No.: 14/271,492

(22) Filed: May 7, 2014

(65) Prior Publication Data
US 2015/0014950 A1 Jan. 15, 2015

Related U.S. Application Data

(60) Provisional application No. 61/843,968, filed on Jul. 9, 2013.

(51) Int. Cl.
| | | |
|---|---|---|
| B62B 3/02 | (2006.01) | |
| B62D 63/06 | (2006.01) | |
| B62K 27/02 | (2006.01) | |
| B62K 27/00 | (2006.01) | |
| B62B 5/00 | (2006.01) | |
| B62B 5/06 | (2006.01) | |
| B62B 1/00 | (2006.01) | |
| B62B 1/12 | (2006.01) | |
| B62B 3/00 | (2006.01) | |

(52) U.S. Cl.
CPC ............ *B62D 63/062* (2013.01); *B62B 1/002* (2013.01); *B62B 1/12* (2013.01); *B62B 3/009* (2013.01); *B62B 3/02* (2013.01); *B62B 5/0079* (2013.01); *B62B 5/061* (2013.01); *B62B 5/067* (2013.01); *B62K 27/003* (2013.01); *B62K 27/02* (2013.01); *B62B 2206/006* (2013.01); *B62D 63/061* (2013.01)

(58) Field of Classification Search
CPC .............. B62B 1/002; B62B 1/10; B62B 1/12
USPC .................................................. 280/652, 656
See application file for complete search history.

(56) References Cited

U.S. PATENT DOCUMENTS

| | | | |
|---|---|---|---|
| 1,052,953 A | | 2/1913 | Peirce |
| 2,869,661 A | | 1/1959 | Fernandez |
| 3,222,100 A | * | 12/1965 | Lindzy ............................ 296/20 |
| 4,055,354 A | * | 10/1977 | Sharpe ....................... 280/47.31 |
| 4,063,744 A | * | 12/1977 | Fraser .............................. 280/42 |
| 4,214,774 A | | 7/1980 | Kluge |
| 4,253,677 A | * | 3/1981 | Wissler ............................ 280/40 |
| 4,444,405 A | * | 4/1984 | Barrus ......................... 280/47.3 |
| 4,624,467 A | * | 11/1986 | Burns .............................. 280/40 |
| 4,705,280 A | * | 11/1987 | Burns .............................. 280/40 |
| 4,826,202 A | * | 5/1989 | Morrissette ................... 280/652 |
| 5,330,212 A | * | 7/1994 | Gardner ........................... 280/40 |
| 5,562,299 A | * | 10/1996 | Morrissette ................... 280/652 |
| 5,620,193 A | * | 4/1997 | Dschaak ..................... 280/47.31 |

(Continued)

*Primary Examiner* — Jeffrey J Restifo
(74) *Attorney, Agent, or Firm* — Hancock Hughey LLP (57) ABSTRACT

A two-wheeled cart is especially adapted for use as a game cart and may be easily towed by a conventional mountain bike. The cart has two interchangeable wheel positions. In the first wheel position the wheels are attached to the frame at opposite lateral sides of the cart and in this position the center of mass of a load carried on the bed of the cart is relatively low. In the second wheel position the wheels are aligned one in front of the other along the direction of travel as the cart is moved; in this position, the bed of the cart is raised to a relatively higher position than the position of the bed when the wheels are in the first wheel position so the center of mass of a load carried on the bed is relatively higher than when the wheels are in the first wheel position.

10 Claims, 10 Drawing Sheets

(56) References Cited

U.S. PATENT DOCUMENTS

| | | | |
|---|---|---|---|
| 5,673,928 A * | 10/1997 | Jury | 280/645 |
| 5,687,978 A * | 11/1997 | Rhodes et al. | 280/30 |
| 5,765,843 A | 6/1998 | Miller | |
| 5,820,141 A | 10/1998 | Wilkerson et al. | |
| 5,853,189 A * | 12/1998 | Swartzlander | 280/652 |
| 5,887,879 A * | 3/1999 | Chumley | 280/40 |
| 5,984,326 A | 11/1999 | Abraham et al. | |
| 6,217,043 B1 * | 4/2001 | Chumley | 280/40 |
| 6,260,864 B1 * | 7/2001 | Smith | 280/47.26 |
| 6,270,092 B2 * | 8/2001 | Darling, III | 280/30 |
| 6,283,496 B1 * | 9/2001 | Dickmann | 280/652 |
| 6,341,787 B1 * | 1/2002 | Mason | 280/47.26 |
| 6,585,285 B2 * | 7/2003 | Koch | 280/656 |
| 6,688,635 B1 * | 2/2004 | Watts | 280/652 |
| 6,811,179 B2 * | 11/2004 | Woods | 280/652 |
| 6,811,180 B1 * | 11/2004 | Molliere | 280/652 |
| 6,991,250 B2 * | 1/2006 | Lindsey et al. | 280/651 |
| 7,017,939 B2 * | 3/2006 | Darling, III | 280/652 |
| 7,055,848 B1 * | 6/2006 | James | 280/656 |
| 7,150,465 B2 * | 12/2006 | Darling, III | 280/640 |
| 7,172,207 B2 * | 2/2007 | Henry | 280/651 |
| 7,770,913 B2 * | 8/2010 | Cannon | 280/656 |
| 7,775,530 B2 * | 8/2010 | Darling, III | 280/47.18 |
| 7,780,185 B2 * | 8/2010 | McConkey et al. | 280/656 |
| 7,793,744 B1 * | 9/2010 | Hardie | 180/19.1 |
| 7,963,531 B2 * | 6/2011 | Panigot | 280/40 |
| 7,967,325 B1 * | 6/2011 | Burton et al. | 280/656 |
| 8,087,683 B2 | 1/2012 | James | |
| 8,256,794 B1 * | 9/2012 | Burton et al. | 280/656 |
| 2003/0205885 A1 * | 11/2003 | Woods | 280/652 |
| 2010/0013182 A1 * | 1/2010 | Kergosien et al. | 280/204 |

* cited by examiner

CART

TECHNICAL FIELD

The present invention relates to apparatus used to transport loads, and more particularly to a multi-use cart that is adaptable for towing, for example, with a bicycle, and for manual use when disconnected from the towing vehicle; the cart has multiple wheels with multiple wheel positions for use in different situations.

BACKGROUND

Wheeled carts are used ubiquitously around the world and have been used for centuries for innumerable purposes. As would be expected, there as many different designs for wheeled carts as there are uses for them. There are carts for home use, farm use, for use by contractors, powered carts, hand carts, and carts for pulling by draught animals and many, many others. Most carts have 2 wheels, sometimes more, and have some type of interface for the person or animal or engine that is powering it. The vast majority of carts have their two wheels axially aligned at opposite lateral sides of the cart. Still other types of carts have their two wheels aligned one in front of the other.

Regardless of the design and function of a cart, the basic idea is that the cart is used to transport a load. This basic idea is embodied in thousands of ways around the world.

Focusing on one general type of cart, a common cart used by outdoorsmen is aptly named a "game cart." Hunters and other outdoorsmen us a game cart to haul loads in a variety of outdoor conditions. Sometimes game carts are used to haul game out of the woods. Sometimes the carts serve double duty and are used to haul camping equipment into the woods to a hunting camp. Hauling game out of the woods can be heavy work; a quartered elk can weigh upwards of 100 lbs. Even with a cart, hauling an elk out of the woods to a location where a vehicle can reach the hunter can be a difficult task and it can take several loads to finish the job. But without a cart the job can be backbreaking. It will be appreciated that to be useful, a game cart must be suited for transport over rough and uneven ground, hills, streams and all kinds of obstacles. As such, a variety of carts have been developed specifically for use as game carts.

But despite the many types of carts available on the market, there is a need for highly functional designs that make the job of hauling loads over rough, uneven ground easier. For example, many hunters have found that good hunting grounds may be accessed by bicycle, for example, mountain bicycles. It would be advantageous to use a wheeled cart that is suited to use in rough terrain and which may be towed by a bicycle.

The present invention comprises a cart that is especially adapted for use as a game cart, although it is not limited to such use. The cart may be easily towed by a conventional mountain bike and is strong and light weight enough to allow use on a variety of difficult terrain. The cart has two wheels, each typically defined by a pneumatic tire such as a mountain bike tire. There are two interchangeable wheel positions. In the first wheel position the wheels are axially aligned at opposite lateral sides of the cart. That is, the wheels are mounted to the frame in a side-by-side orientation with the axle of one wheel substantially axially aligned with the axle of the other wheel. This is the wheel placement that might be used, for example, when the cart is being towed behind a bike. In this position the center of mass of a load carried on the bed of the cart is relatively low. In the second wheel position the wheels are aligned one in front of the other along the direction of travel as the cart is moved, in a front-to-back orientation. In this position the axle of the forward wheel defines an axis that is parallel to and spaced apart forward of the axle of the rearward wheel. This is the wheel placement that might be used when the cart is disconnected from a bike and is being used to haul a load—game—out of the woods. In this position, the bed of the cart is raised to a relatively higher position than the position of the bed when the wheels are in the first wheel position. As such, when the wheels are in the second wheel position the center of mass of a load carried on the bed is relatively higher than when the wheels are in the first wheel position. This makes it much easier for the user to move the cart over obstacles such as those that could be expected when hauling game out of the woods, for example, over down trees, across steep side hills, etc.

The cart of the present invention incorporates quick change structures that allow the wheel positions to be changed quickly and easily without detaching the wheel attachment members—the forks—from the cart frame. The cart incorporates handles and legs that may be used in various configurations as detailed below.

BRIEF DESCRIPTION OF THE DRAWINGS

The invention will be better understood and its numerous objects and advantages will be apparent by reference to the following detailed description of the invention when taken in conjunction with the following drawings.

FIGS. 1 through 8 are a series of views of a first illustrated embodiment of a cart according to the present invention. More specifically, In FIG. 1 the cart's two wheels are axially aligned in a first wheel position.

FIGS. 9 through 12 are a series of views of an alternative embodiment of a cart according to the present invention. Specifically.

DETAILED DESCRIPTION OF ILLUSTRATED EMBODIMENTS

Figure 1:
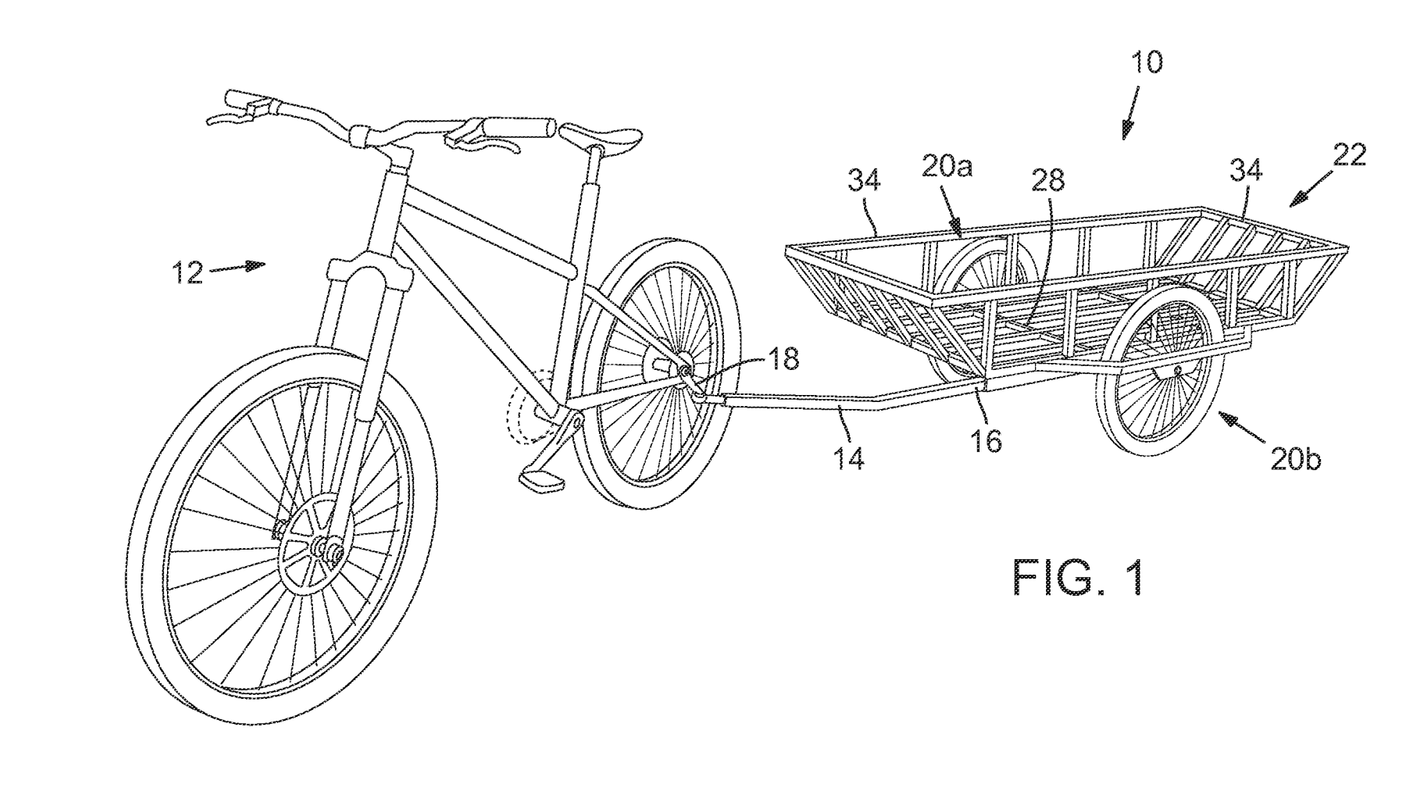
FIG. 1 is a perspective of the first embodiment of the cart of the present invention showing the cart attached to a bicycle for towing the cart.

The invention will now be described in detail with reference to the drawings. It will be understood that relative directional terms are used at times to describe components of the invention and relative positions of the parts. As a naming convention, the plane of the ground on which the cart is oriented, for example, in FIG. 1, is considered to be a generally horizontal surface, at least for the description of the invention herein. Of course, in normal use the cart will be used on a wide variety of terrain. But directional terms used herein correspond to the horizontal ground plane of FIG. 1: "upper" refers to the direction above and away from the ground plane; "lower" is generally in the opposite direction, "inward" is the direction from the exterior of the frame of the cart toward the interior, "vertical" is the direction normal to the horizontal ground plane, and so on.

The phrase "direction of travel" and "movement axis" are used at times herein and refer to the linear path of travel along which a bike moves as it is moved forward, and also the linear path of travel of a cart pulled by the bike.

Turning now to the drawings, a first embodiment of a cart 10 is shown attached to a conventional mountain bike 12 with a tongue 14 having a first end 16 attached at an articulating joint 18 to the bike 12's axle, which typically is defined by a conventional quick release skewer. The manner of attaching tongue 14 to the bike 12 is entirely conventional but is shown for illustrative purposes. As the bike moves forward in its "direction of travel," the cart follows the bike directly. The direction of travel, which as noted is a liner path defined by the bike's forward travel, likewise defines a travel axis for the cart as the cart is pulled by the bike. The cart's "travel axis" or "movement axis" as defined herein is thus parallel to (or the same as) the direction of travel.

In FIG. 1 the two wheels 20a and 20b of cart 10 are attached to the cart in the first wheel position. In this position, the wheels are mounted to opposed lateral sides of cart 10 such that the wheels are in a side-by-side orientation with the axle of one wheel substantially axially aligned with the axle of the other wheel, with the wheels individually attached (with standard bicycle quick release skewers, for example) to the opposite lateral sides of the cart 10, as detailed below. In this first wheel position the axles of the wheels 20a and 20b are at approximately the same level as the bed of the frame and the wheel axles are approximately coaxially aligned. The axles are thus oriented transverse to the travel axis. With the wheels 20a and 20b in this first wheel position, the weight of a load carried on the bed is distributed relatively low to the ground (as opposed to the weight of a load when the wheels are in the second wheel position as detailed below).

Another way to describe the relative orientation of the wheels in relation to the plane of rotation of the wheels. When the wheels are in their first wheel position, the plane of rotation of wheel 20a is parallel to and offset from the plane of rotation of wheel 20b.

Figure 3:
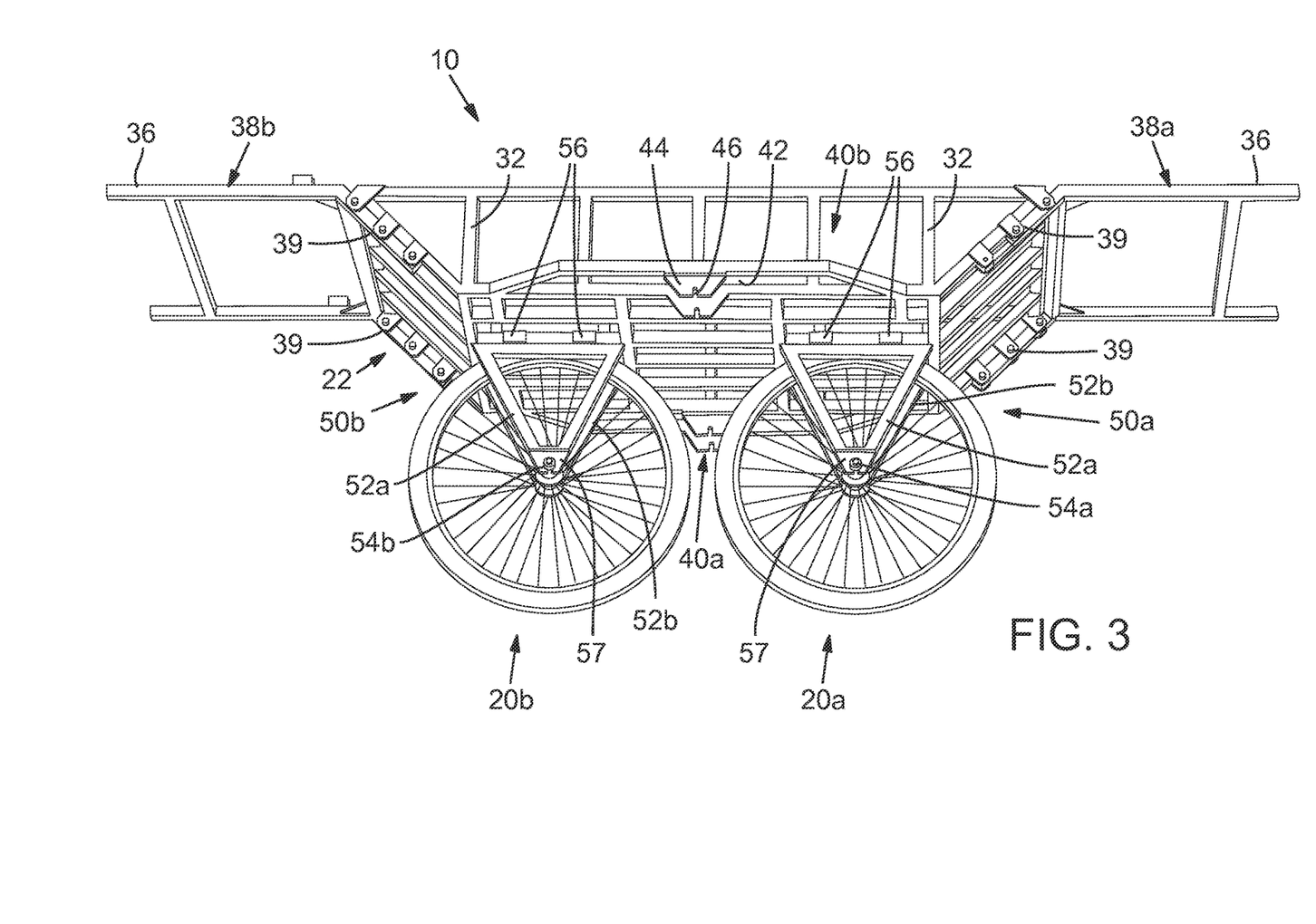
FIG. 3 is a lower perspective view of the cart shown in FIG. 2 except in FIG. 3 the wheels have been moved to a second wheel position in which the wheels are aligned one in front of the other in the direction of travel.

The frame of cart 10 is shown in isolation in FIG. 3 (with wheels 20a and 20b removed) and is identified generally with reference number 22. Frame 22 is a generally box-shaped frame having opposed side beams 24a and 24b at opposite sides of the frame, and interconnected with forward transverse beam 26a and rearward transverse beam 26b. To strengthen the frame, the frame includes both additional beams 25 extending along the movement axis of the frame, between the side beams 24a and 24b and also interconnected with the forward and rearward transverse beams 26a and 26b. Additional transverse beams may also be used between the two forward and rearward transverse beams. The number and spacing of the beams 25 and transverse beams is variable will depend on factors such as the size and load-carrying capacity of the cart 10.

The combined beams described above define a frame bed 28. Frame bed 28 is a generally planar part of the frame 22 and is configured to be the load-carrying part of the cart. The frame bed 28 may optionally be covered with an open mesh plate.

The beams used to construct the frame 22 may be any suitable material, but for strength and lightness aluminum square tubing is a good working material. The number of beams, both longitudinal and transverse, and the spacing between adjacent beams, depends on the size of the cart and the size and configuration of the beams and other factors.

The embodiment of cart 10 shown in FIGS. 1 through 8 includes plural vertical upright support members 32 attached (for example, by welding) to the outer perimeter of the frame 22 and top rails 34 that interconnect the upright support members together define side rails. And in FIGS. 1 through 8 the upright support members 32 at the front and rear ends of the cart are angled with respect to the planar frame bed 28, which defines a slightly larger cargo area over frame bed 28. The height of the side rails is variable or the side rails may be omitted, or, for example, hinged to allow the rails or a portion of them to be dropped down to allow easier loading of cargo onto the frame bed 28.

Figure 4A:
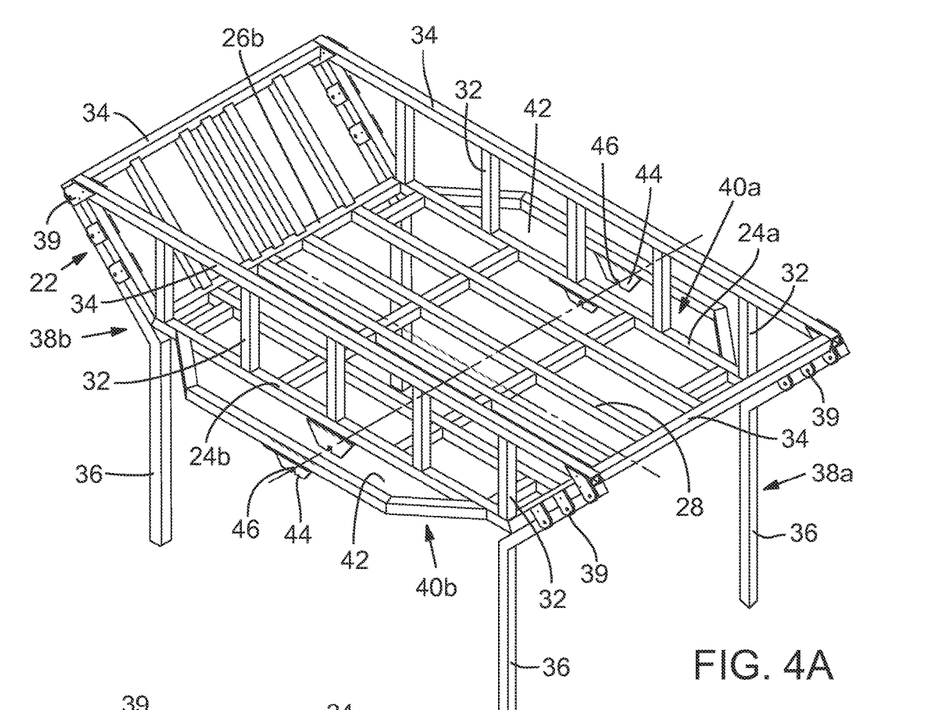
FIG. 4A is an upper perspective view of the cart of FIG. 1 with the wheels removed and the handles moved into a position where the handles define legs for supporting the cart as a table-like platform.
Figure 4B:
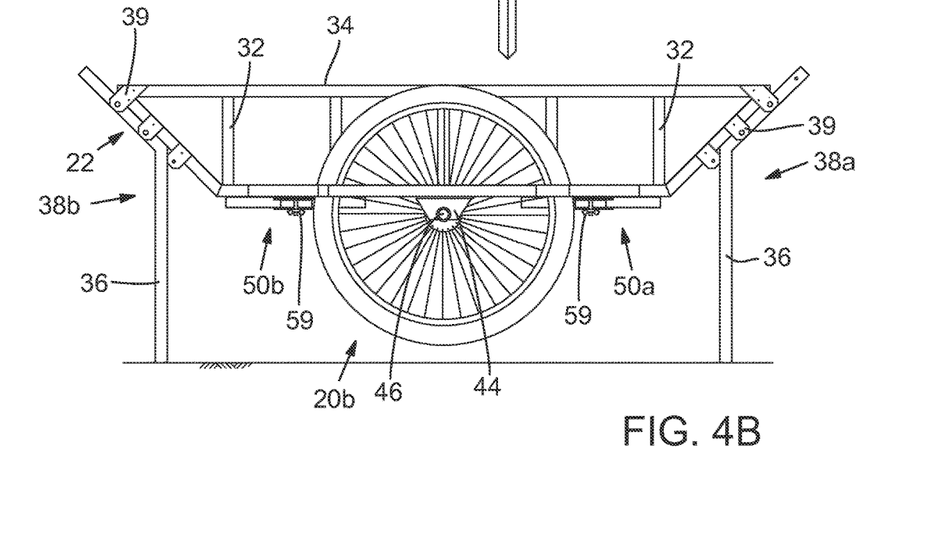
FIG. 4B is a side elevation view of the cart shown in FIG. 4A with the wheels attached in their first wheel position.
Figure 5:
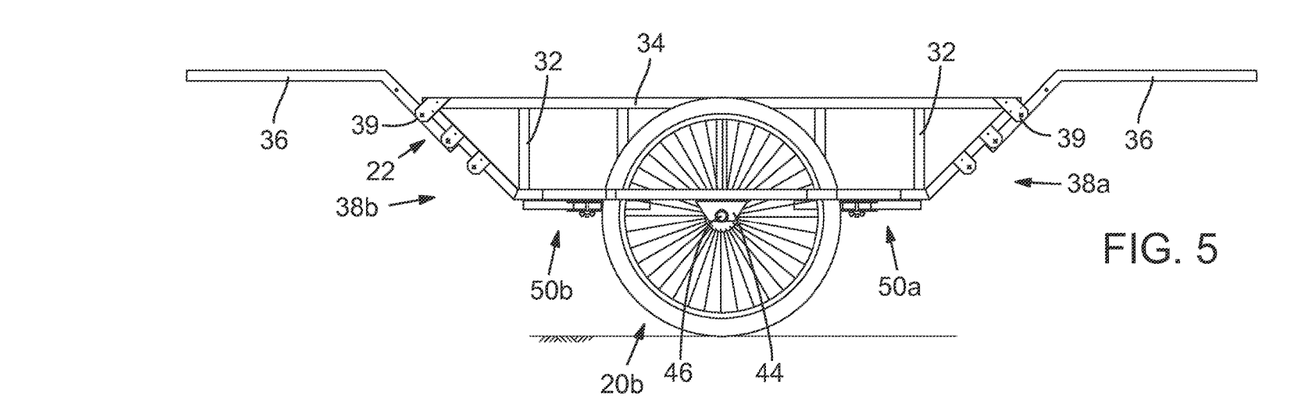
FIG. 5 is a side elevation view of the cart shown in FIG. 2.
Figure 6:
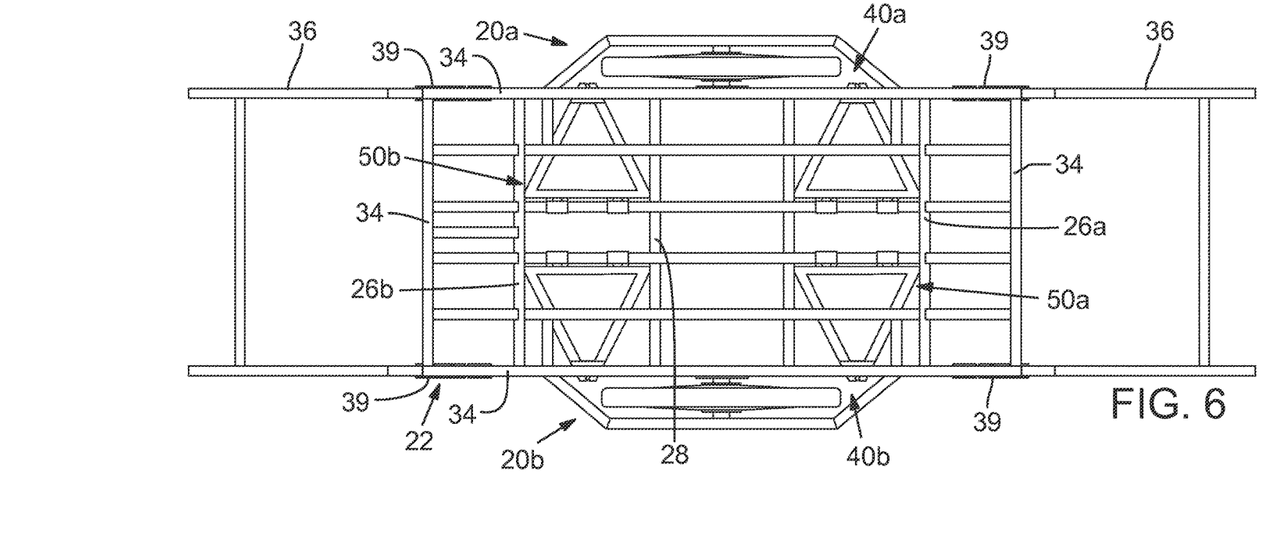
FIG. 6 is a top plan view of the cart shown in FIG. 2.

There are a wide variety of different handle configurations that may be utilized with a cart 10. The cart 10 in FIG. 2 includes forward and rearward handles 38a and 38b, respectively, and in this figure the handles are in their extended or use positions. The handles 38a and 38b are removably attached to the angled upright support members 32 of frame 22 with plural brackets 39 that utilize pins such as clevis pins, or other attachment members. As seen in FIGS. 4A and 4B, the handles 38a and 38b may be reversed from the positions shown in FIG. 2 so that the handles define legs 36 that support the frame 22 in a table-like position. Those of skill in the art will readily appreciate that the handle configurations may be varied in many ways from those shown in the drawings.

Turning to FIG. 3, the wheels 20a and 20b are shown in the second wheel position. Here, wheel 20a is directly in front of wheel 20b in the same manner that a bicycle's wheels are front-to-back aligned when the bike is traveling in a straight line. This front-to-back alignment may also be seen in FIGS. 5 and 8. As may be readily seen, in this position the wheel axles 21 are axially offset from one another and positioned at a level well below the frame bed 28. As such, the center of mass of a load carried on frame bed 28 with the wheels in their second wheel position is far higher relative to the wheels in their first wheel position of FIG. 1.

Using the relative orientation of the wheels in relation to the plane of rotation of the wheels to describe the wheels in their second wheel position, when the wheels are in their second wheel position, the plane of rotation of wheel 20a is common to the plane of rotation of wheel 20b.

Figure 7:
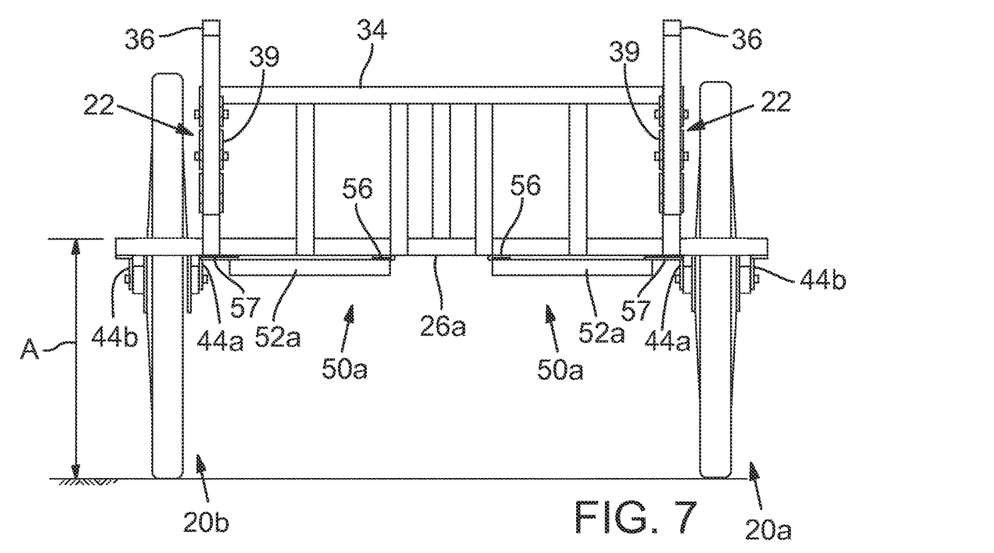
FIG. 7 is front plan view of the cart shown in FIG. 2 with the wheels in the first wheel position.
Figure 8:
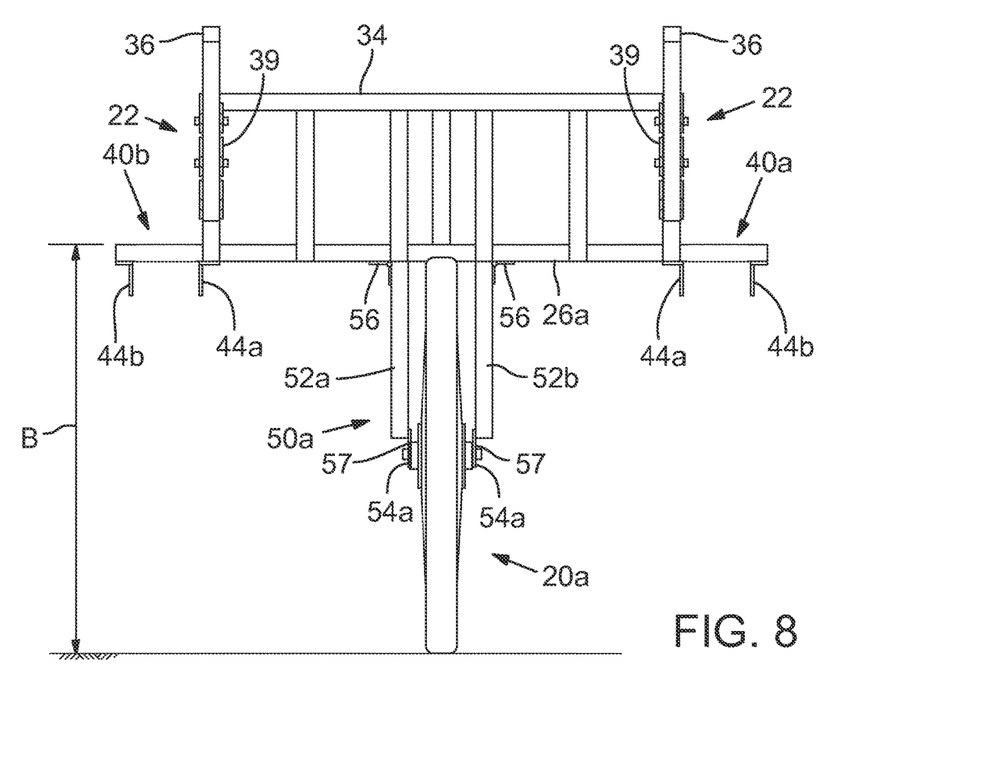
FIG. 8 is front plan view of the cart shown in FIG. 3 with the wheels in the second wheel position.

The differences in the level of the frame bed 28 relative to the ground plane when the wheels are in either their first or second wheel positions are best illustrated in FIGS. 7 and 8. In FIG. 7, the wheels 20a and 20b are in the first wheel position and the level of the frame bed 28 above the ground is shown with distance A. In FIG. 8, the wheels 20a and 20b are in the second wheel position and the level of the frame bed 28 above the ground is shown with distance B. Distance A is less than distance B. Accordingly, if a load is placed on frame bed 28, the center of mass of the load carried on the cart in FIG. 7 will be higher than the center of mass of the load carried on the cart in FIG. 8. Another measure of the differences between wheel positions is the measure of the distance from frame bed 28 to the wheel axles. When the wheels are in the first wheel position the distance between the axles and the bed is substantially less than the distance between the axles and the bed when the wheels are in the second wheel position.

These differences in the location of the center of mass depending on whether the wheels are in their first wheel position or their second wheel position are important from an operational perspective for the cart. Assume that a hunter is using the cart 10 to transport large game from where the place where it lays to base camp, over rough ground with side hills and the like, without use of a bike 12 in view of the nature of the terrain. In this case, the wheels 20a and 20b will be in their second wheel position. In this position, with the wheels in their fore/aft aligned positions, and even with a heavy load on frame bed 28, the hunter is able to push and or pull the cart 10 over rough terrain and obstacles and across side hills relatively easily because the center of mass of the load is relatively high (i.e., distance B, FIG. 8) and the cart may be tilted about both the travel axis and the axis transverse to the travel axis as needed (for example, on a side hill). Next, assume that the hunter is using the cart 10 to transport large game from base camp to the hunter's truck, along a road that is relatively smooth and with use of a bike 12 as shown in FIG. 1. In this case, the wheels 20a and 20b will be in their first wheel position, side-by-side. In this position, the center of mass on frame bed 28 is relatively low (i.e., distance A, FIG. 7). In this modality with the low center of mass and the axially aligned wheels the load is very stable and easy to pull with the bike.

In FIG. 4 it may be seen that the cart 10 is supported with frame bed 28 in a horizontal position with legs 36a and 36b that are defined by the opposed extensions from the handles 38a and 38b, respectively. The handles 38 may be attached to the frame 22 for quick connect/disconnect, with for example ball-lock type pins or any variety of clevis pins with corresponding brackets such as channels that have bores through which the pins extend. The handles 38 may be stowed on top of and parallel to the top rails 34 for storage when the cart 10 is being transported.

The manner of attaching the wheels 20a and 20b to frame 22 in both the first and the second wheel positions will now be detailed. Generally speaking, the wheels are attached to frame 22 in a manner such that they are easily moved between the first and the second wheel positions. However, in both wheel positions the support members to which the wheels are mounted are not detachable from the frame 22.

Figure 2:
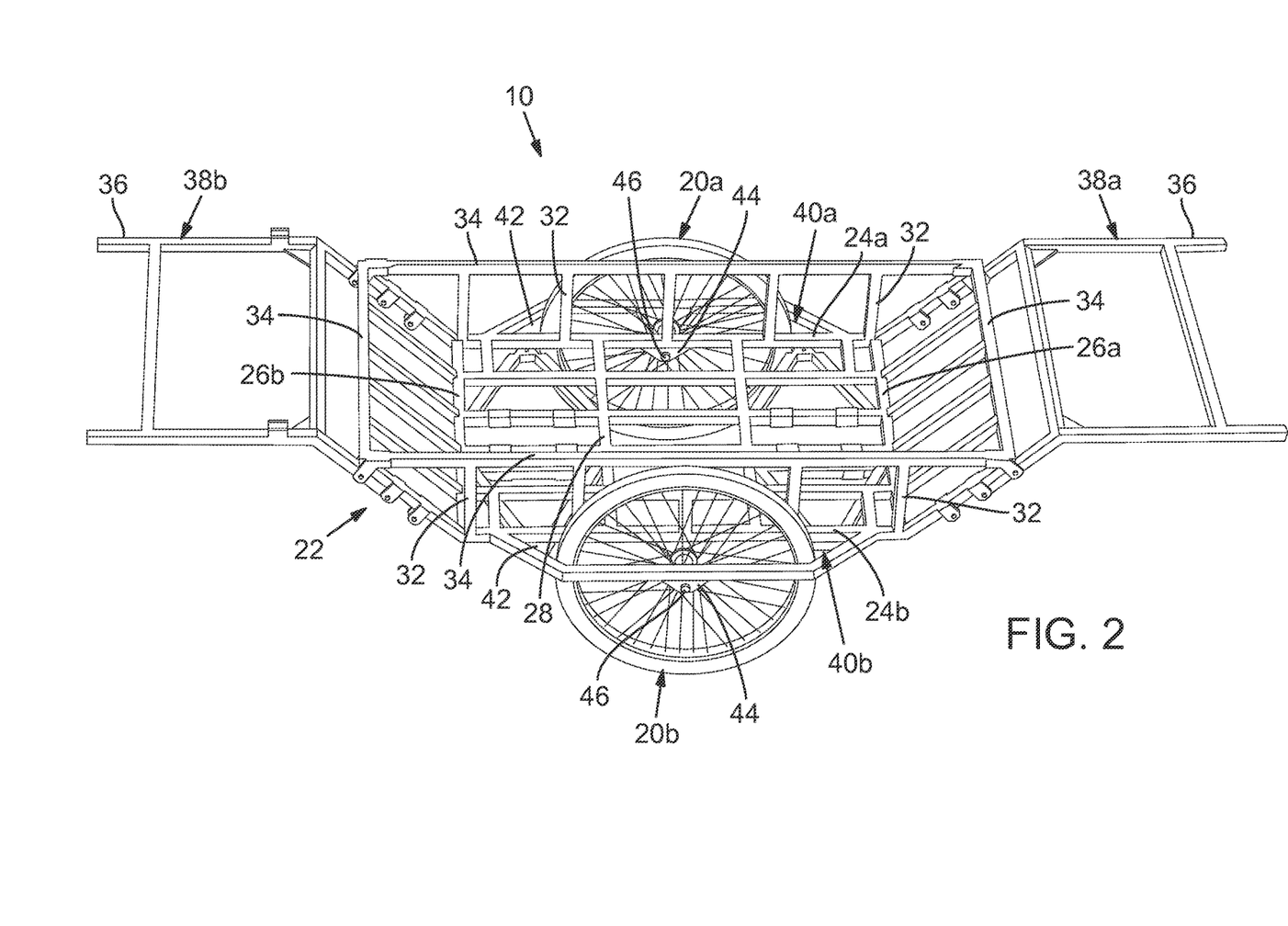
FIG. 2 is an upper perspective view of a cart similar to the cart shown in FIG. 1, except with the stowable handles in an extended position.

With specific reference to FIGS. 2, 3 and 4, a wheel outrigger frame 40 is attached to each side beam 24 near the middle of the side beam (the outrigger with reference number 40a is attached to side beam 24a and the outrigger 40b is attached to beam 24b). The wheel outrigger frames 40 extend away from the beam to define a space 42 between the frame 40 and the side beam 24. Each outrigger frame 40 includes two downwardly depending plates 44 an inner plate 44 and out outer plate 44, to which the wheels 20a and 20b are mounted (FIGS. 7 and 8). Thus, a plate 44a depends downwardly from side beam 24a and a corresponding plate 44b is attached to and depends downwardly from frame 40 such that the plates 44a and 44b are aligned. More specifically, each plate 44a and 44b includes a notch 46 that functions as a conventional bicycle "dropout" for accepting the opposite ends of the quick disconnect skewer that extends through the wheel's hub. Again referring to FIG. 1, with wheels 20a and 20b attached to the respective outrigger frames 40a and 40b (the later of which is not visible in FIG. 1), the axle of each wheel is at approximately the same height above the ground as the frame bed 28 and the upper half of each wheel extends through space 42 so that the wheel rotates freely. The axle of each wheel is thus below the level of frame bed 28 only by the height of plates 44a and 44b. This is shown in FIGS. 4 and 7.

The wheel support brackets 50 that attach wheels 20a and 20b to the frame 22 when the wheels are in the second wheel position are shown in FIG. 4. Support bracket 50a attaches wheel 20a in front of support bracket 50b, which is directly behind support bracket 50a and aligned therewith to mount wheel 20b relative to 20a in an aligned front to rear direction along the movement axis. Each support bracket 50 is identical and is defined by two generally triangular frame members, labelled with reference numbers 52a and 52b that have a dropout 54 at the lower apex 57 of the triangular frames and for accepting the quick disconnect skewers that extend through the wheel hubs. The upper section of each of the triangular frames 52 is permanently hingedly attached to the frame, for example, on beams that define the frame bed 28, with hinges 56. Each of the triangular frames 52 is independently movable about the hinged connection defined by hinges 56 between an in-use position in which the frames 52a and 52b extend downwardly from the frame 22 (e.g., FIGS. 3, and 8) to mount the wheels 20 in the second wheel position, and a stowed position in which the wheels 20 are detached from the support brackets and the triangular frames 52a and 52b are moved about the hinged connection to lie flush or flat against the bottom surface of the frame 22 (e.g., FIGS. 4B and 7). The frames 52a and 52b may be secured in the stowed position with appropriate fasteners such as wing nuts 59 (FIG. 4B) or clevis pins and the like. With the support brackets 50 in the stowed position and secured, the wheels 20a and 20b may be mounted to the outrigger frames 40 as detailed above (i.e., in the first wheel position), or the wheels may be removed altogether (e.g., FIG. 4A).

It will be noted for emphasis from FIGS. 7 and 8 that with the wheels in the second wheel position the wheel axles are positioned well beneath the level of the frame bed 28. As such, and as detailed above, the center of mass of a load on the frame bed 28 is relatively high in comparison to the first wheel position. This is illustrated by comparison of distance A in FIG. 7 (with wheels 20 in the first wheel position) and distance B in FIG. 8 (with wheels 20 in the second wheel position); distance B is substantially and always greater than distance A. It will also be understood that a centerline along the frame bed 28 is coincident with the travel axis of the cart and that the plane of rotation of the wheels 20a and 20b when the wheels are in the second wheel position is substantially coincident with the travel axis.

From the foregoing it will be readily appreciated that with the wheel 20a in its second wheel position and with wheel 20b removed, yet another configuration for cart 10 may be achieved where the cart is a conventional wheelbarrow.

FIGS. 9 through 12 illustrate a second embodiment of a cart 100 according to the present invention. The cart 100 in this series of figures has the same structural and operational attributes as the cart 10 described above in respect of FIGS.

1 through 8 and like reference numbers are used to identify like structures. However, as detailed below, the embodiment in FIGS. 9 through 12 includes some differing structural features.

Figure 9:
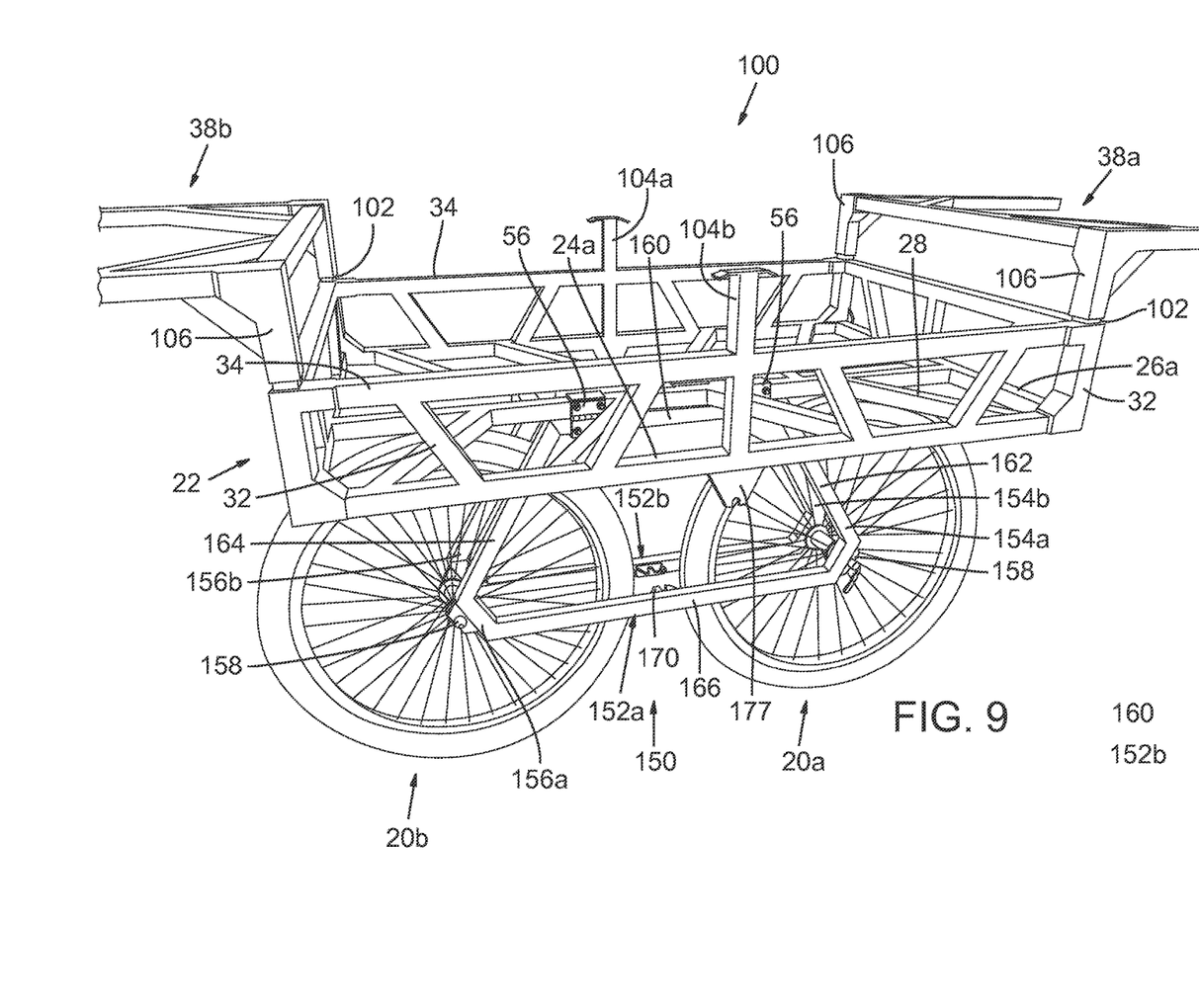
FIG. 9 is a side perspective view of an alternative embodiment in which the wheels are in the second wheel position.

The cart 100 of FIG. 9 illustrates the highly variable manner in which the upright supports 32 and top rails 34 may be attached to frame 22. The handles 38a and 38b in the cart 100 of FIG. 9 are removably mounted to posts 102 that extend upwardly from upright supports 32 at each of the four corners of the frame 22—the handles have sleeves 106 that slide onto the posts 102. The handles 38 in FIG. 9 are in their extended positions. They may be moved to their stowed positions by removing the handles from the posts 102 by sliding them upwardly, then rotating each handle by 180 degrees and sliding the handles back onto the posts 102 with the posts extending into the sleeves 106. Upright supports 104a and 104b extend upwardly from upper rails 34 to support the handles 38 when they are in their stowed positions. In all embodiments and configurations, the handles are fabricated to be easily detachable from the frame so that they may be repositioned and stowed on the frame, for instance, when the cart is attached to a bicycle for towing.

The cart 100 of FIGS. 9 through 12 has wheels 20a and 20b that are movable between first and second wheel positions with the same attributes as those described above with respect to cart 10. However, the primary distinction between cart 100 and cart 10 is the manner in which the wheels are attached to frame 22 and are moved between the first wheel position and the second wheel position.

Figure 10:
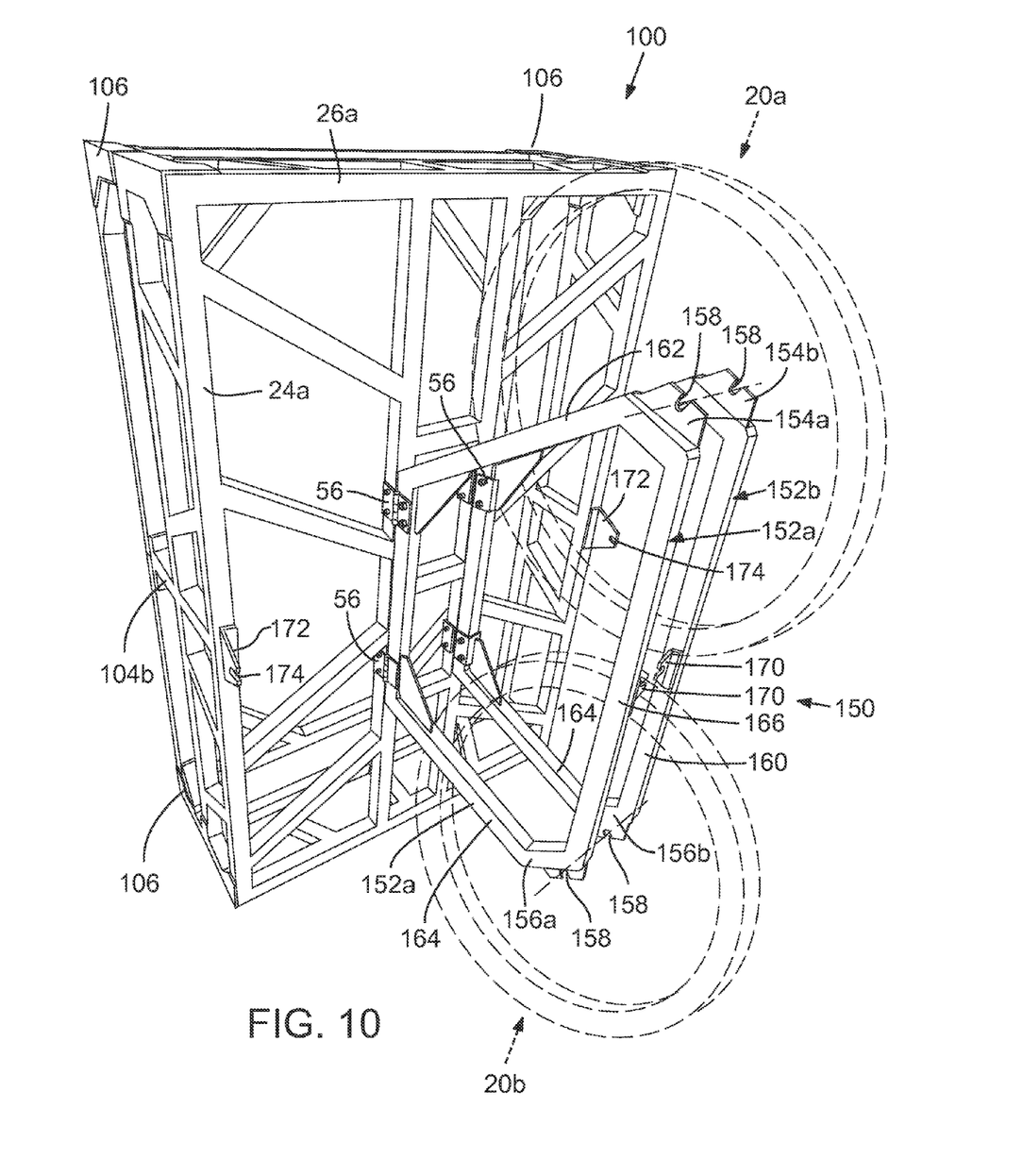
FIG. 10 is a lower perspective view of the cart shown in FIG. 9, showing the wheels in phantom lines in their second wheel position.
Figure 11:
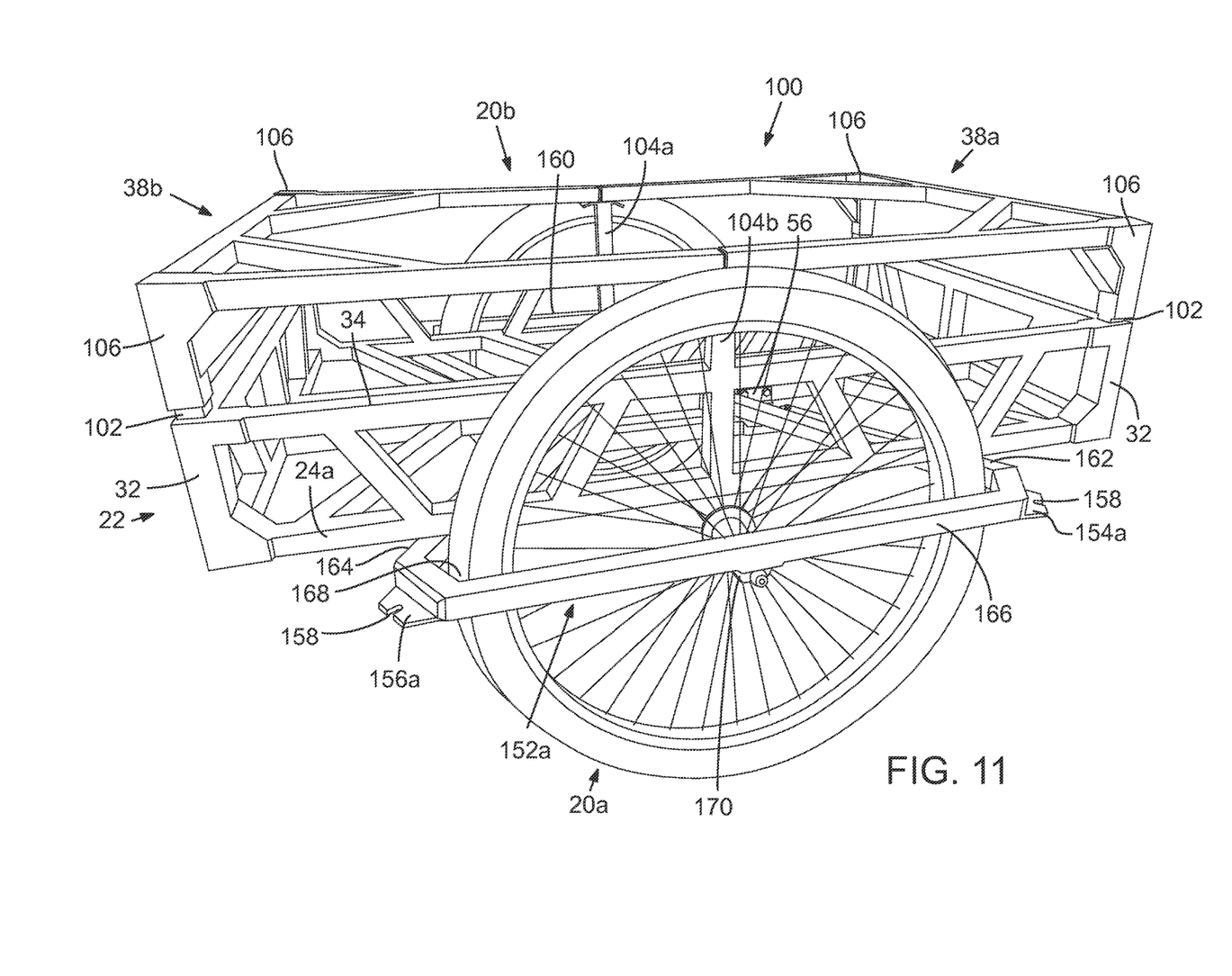
FIG. 11 is an upper side perspective view of the cart shown in FIG. 9 with the handles moved into their stored positions and illustrating the wheels in their first wheel position with the wheels axially aligned.
Figure 12:
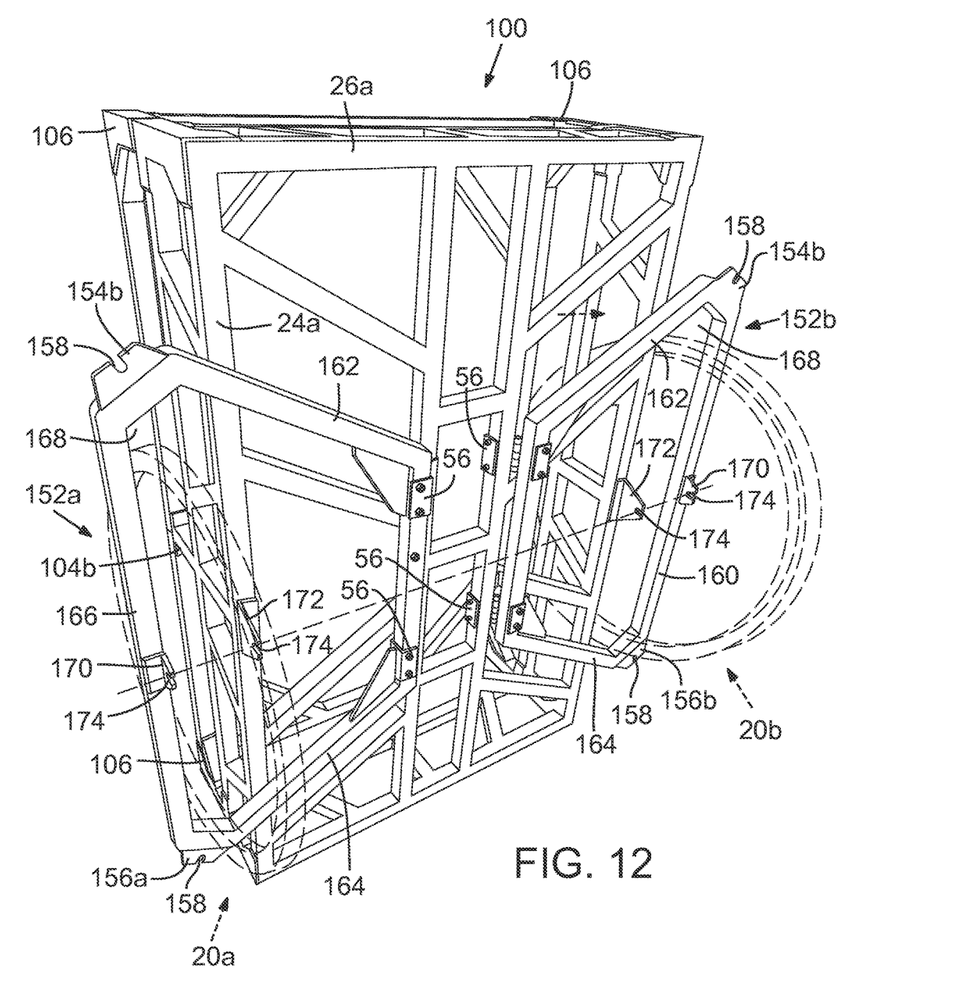
FIG. 12 is a lower perspective view of the cart shown in FIG. 11 with the wheels shown in phantom lines.

In FIGS. 9 and 10 the wheels 20 are shown in the second wheel position—that is, with the wheels in a front-to-back alignment along the travel axis. The wheels are mounted to frame 22 in this position with a single wheel support bracket 150 that is defined by paired frames 152a and 152b that are attached by hinges 56 to frame 22 for movement between a downward position (FIGS. 9 and 10) and an upward position (FIGS. 11 and 12). Frames 152a and 152b are identical and each has a first wheel 20a mount defined by a wheel mount bracket 154a on frame 152a and an aligned wheel mount bracket 154b on frame 152b. Each frame 152 has a second wheel mount defined by a wheel mount bracket 156a on frame 152a and an aligned wheel mount bracket 156b on frame 152b. With the frames 152a and 152b in their downward positions, dropout notches 158 on each of the brackets 154a and 154b, and 156a and 156b, are aligned to accept the axles on wheels 20a and 20b, respectively, to mount the wheels to the frames.

Each frame 152 comprises an upper arm 160 that is hinged to frame 22 with hinges 56, a forward downwardly depending arm 162 that attaches to one end of arm 160 at a forwardly extending angle, a rearward downwardly depending arm 164 that attaches to the opposite end of arm 160 and a rearwardly extending angle, and an arm 166 that interconnects the ends of arms 162 and 164.

Wheels 20a and 20b are in their first wheel position in FIGS. 11 and 12. In this position, frames 152a and 152b have been pivoted on hinges 56 such that the arms 162 and 164 lie flat against the supports that define bed 28. The length of arms 162 and 164 is sufficient that in this position the arm 166 is located outwardly of the lateral side edge of frame 22 to define a wheel receiving space 166. A wheel mounting bracket 170 is attached to arm 166 such that when the frame 152a is in the position shown in FIG. 11, the mounting bracket extends downwardly. A mounting bracket 172 is attached to frame side beam 24a and is position such that dropout notch 174 bracket 172 aligns with a like dropout notch in bracket 170. Accordingly, the wheels 20a and 20b are mounted in the first wheel position with the wheels axially aligned in wheel receiving spaces 166 on each lateral side of the frame, as shown in FIG. 12.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A cart, comprising:
a frame defining a frame bed;
two wheels attached to the frame and selectively interchangeable between first and second wheel positions, each of said two wheels having a wheel axle, wherein in the first wheel position the wheels are mounted to the frame such that the wheel axle of the first wheel is substantially axially aligned with the wheel axle of the second wheel, and in the second wheel position the wheel axle of the first wheel is parallel to and spaced apart from the wheel axle of the second wheel;
wherein when the wheels are in the first wheel position the frame bed is at a first level relative a ground plane and when the wheels are in the second wheel position the frame bed is at a second level relative to the ground plane, and wherein the second level is above the first level relative to the ground plane.

2. The cart according to claim 1 wherein each wheel defines a plane of rotation and wherein when the wheels are in the first wheel position the plane of rotation of the first wheel is parallel to and spaced apart from the plane of rotation of the second wheel.

3. The cart according to claim 2 wherein when the wheels are in the second wheel position the plane of rotation of the first wheel is common with the plane of rotation of the second wheel.

4. The cart according to claim 1 including a pair of second wheel position mounting brackets for mounting each of the wheels in the second wheel position, each of the second wheel position mounting brackets defined by a pair of members independently attached to the frame and independently movable between a stowed position in which the members are substantially flush with the frame and an in use position in which the members extend downwardly from the frame for mounting the wheels.

5. The cart according to claim 4 in which each of the pair of members is attached to the frame so that the wheels are mounted to the members with the plane of rotation of the wheels being substantially coincident with a travel axis of the cart.

6. The cart according to claim 4 including a first wheel position mounting bracket for mounting each of the wheels in the first wheel position, each of the first wheel position mounting brackets defined by a pair of wheel dropout members mounted to opposite lateral sides of the frame.

7. The cart according to claim 4 in which each of the pair of members is attached to the frame so that the wheels are mounted to the members with the plane of rotation of the wheels being substantially coincident with a travel axis of the cart.

8. A cart, comprising:
a frame defining a frame bed for carrying a load and said cart having opposed lateral side beams;
first wheel mounts for mounting first and second wheels to the frame in a first wheel position in which said first and second wheels are substantially axially aligned;

second wheel mounts for mounting the first and second wheels to the frame in a second wheel position in which said first and second wheels are substantially aligned one behind the other;

wherein said first and second wheels may be selectively moved between the first and second wheel positions; and wherein when the wheels are in the first wheel position the frame bed is at a first level above a ground plane and when the wheels are in the second wheel position the frame bed is at a second level above the ground plane, where the first level is different from the second level, and wherein the second level is greater than the first level relative to the ground plane.

9. The cart according to claim 8 having a first bracket for mounting the first wheel in the second wheel position, a second bracket for mounting the second wheel in the second wheel position, a first bracket for mounting the first wheel in the first wheel position and a second bracket for mounting the second wheel in the first wheel position.

10. A cart, comprising:

a frame having a frame bed;

first wheel mounts for mounting first and second wheels to the frame to thereby support the frame at a first wheel position in which the frame bed is at first level relative to a ground plane;

second wheel mounts for mounting the first and second wheels to the frame to thereby support the frame at a second wheel position in which the frame bed is at second level that is higher than the first level relative to the ground plane;

wherein when the first and second wheels are mounted to the frame in the first wheel position the plane of rotation of said wheels is parallel, and when the first and second wheels are mounted to the frame in the second wheel position the plane of rotation of said first wheel is common with the plane of rotation of said second wheel.

\* \* \* \* \*